United States Patent [19]
Hemphill et al.

[11] Patent Number: 5,878,685
[45] Date of Patent: Mar. 9, 1999

[54] FOAM COLLAR AND BOAT INCORPORATING SAME

[75] Inventors: Douglas Hemphill; Gary Dale, both of Delta, Canada

[73] Assignee: Zodiac Hurricane Technologies, Inc., Delta British Columbia, Canada

[21] Appl. No.: 941,361

[22] Filed: Sep. 30, 1997

[51] Int. Cl.⁶ .................................................. B63B 59/02
[52] U.S. Cl. ........................................... 114/219; 405/215
[58] Field of Search ............................ 114/219; 405/215; 293/120, 136

[56] References Cited

U.S. PATENT DOCUMENTS

| | | | |
|---|---|---|---|
| 3,109,405 | 11/1963 | Nusioff | 114/219 |
| 3,179,397 | 4/1965 | Cleereman et al. | 114/219 |
| 3,411,304 | 11/1968 | Miller | 405/215 |
| 4,060,865 | 12/1977 | Woolworth . | |
| 4,287,624 | 9/1981 | Lowther . | |
| 4,504,534 | 3/1985 | Adachi et al. | 293/120 |
| 4,520,746 | 6/1985 | Walters et al. . | |
| 4,625,674 | 12/1986 | Covington . | |
| 4,807,556 | 2/1989 | Hillier . | |
| 5,205,235 | 4/1993 | Hodges . | |
| 5,282,436 | 2/1994 | Hansen . | |

OTHER PUBLICATIONS

Brochure for Alusafe 2000, no date.
Brochure for Impact 21', The New Soft–Sided Workboat From Boston Whaler, Oct. 1992.
Balmoral Marine Brochure.
SeaArk Marine's RAM Class Patrol Boat Brochure.

*Primary Examiner*—Sherman Basinger
*Attorney, Agent, or Firm*—Larson & Taylor

[57] ABSTRACT

A foam collar system for boats which is affixed to the external surface of the boat hull. The foam collar system is formed from a molded polymeric foam material, a reinforcement coating on the outer surface of the polymeric foam and a surface coating on at least a portion of the reinforcement coating. The foam collar acts as a fender for the boat during boarding of other craft or mooring. In this manner, a durable, highly attractive foam fender system for high speed boats with planing hulls is provided. Also disclosed is a method for making the foam collar and a boat including the foam collar. The foam fender does not require inflation, it can be fabricated in an aesthetically pleasing manner, it is durable and it is inexpensive to make and maintain.

19 Claims, 4 Drawing Sheets

FOAM COLLAR AND BOAT INCORPORATING SAME

BACKGROUND OF THE INVENTION

1. Field of the Invention

The present invention relates to a foam collar system for boats which is affixed to the external surface of the boat hull.

2. Description of the Prior Art

The present invention is directed to solving the problem of providing an external fender system for protecting the hull of a boat. The fender system must not interfere with the normal operation of the boat while providing sufficient protection for the hull of the boat when mooring the boat or bringing the boat along side another boat for boarding. The fender system must also be aesthetically pleasing.

Several constructions for fenders and/or auxiliary flotation for boats are known from the prior art. For example, U.S. Pat. No. 5,205,235 (Hodges) relates to a system of elongate rails installed on the exterior hull surfaces of boats and projecting externally from the exterior hull surfaces. These elongate rails include a skin made from a woven fabric material and an interior made of polyethylene foam. These rails are for the purpose of deflecting spray, reducing the tendency of the bow to go under in choppy or turbulent seas, reducing heel and side-slipping while turning, contributing lift, acting as fenders to protect the hull, providing accessible hand-holds and footsteps, reducing the rocking motion of the boat and adding flotation to the boat.

U.S. Pat. No. 4,060,865 (Woolworth) relates to a small boat comprising a flotation chamber located at the gunwale. The flotation chamber is defined by a first member integral with the sides of the hull extending upwardly and defining an upper end portion and a second member or cover secured at its bottom portion to the hull. A connecting device resiliently engages the upper end portion with the second member to secure a flotation material in the form of a block of expanded polystyrene or the like within the flotation chamber. A rub rail is defined at the upper end of the flotation chamber and can be formed either by a separate connecting member or by a portion of one of the other members. The flotation means of this patent serves both to provide flotation and to act as a rub rail to protect the boat from damage.

U.S. Pat. No. 4,807,556 relates to a rigid inflatable boat including a hull with an inflatable buoyancy collar. The collar comprises a number of separate inflatable members each of which has an axially extending bore so that it may be securely attached to mountings on the hull straps passing through it. Since the inflatable members are separate, rupture of one does not seriously effect either the pressure in the other members or the load capability of the craft.

U.S. Pat. No. 4,520,746 relates to an inflated flotation collar formed by positioning a longitudinal inflatable member along at least part of the length of both the port and starboard sides of the hull. The terminal portions of the member are secured so that the linear length of the gunwale over which the member extends is substantially fixed and so that the member is held substantially at gunwale level on the hull by securing devices passing around and over but not under the hull. This device is provided mainly for flotation and is designed to minimize localized stresses on the hull.

U.S. Pat. No. 4,625,674 (Covington) discloses an aluminum boat including laterally outwardly bowed gunnels. Each of the gunnels is provided with an outer tubular aluminum flotation member extending therealong which is bowed to conform to and is welded to the outer surface of the gunnel. The aluminum tubes are filled with flotation material and have for their primary purpose to provide additional flotation to the boat should it become swamped.

U.S. Pat. No. 4,287,624 (Lowther) discloses auxiliary flotation gear for fishing boats. The flotation gear comprises two float wings of substantially triangular contoured construction which conform to the hull of the boat and are securely affixed to the exterior stern of a fishing boat above the waterline. The float wings may be constructed of a closed cell, rigid foam. The foam is preferably covered with a fabric such as nylon reinforced vinyl or another suitable durable fabric. The float wings are provided to aid flotation and stability should the boat become swamped.

U.S. Pat. No. 5,282,436 (Hansen) relates to a foam stabilized watercraft. The high performance boat of this patent is stabilized through the use of foam stabilizing members mounted on the sides of the hull above the chine and extending from the transom along the length of the boat. The sides of the boat also include an upper and lower flange extending outwardly from the sides of the boat adjacent to the upper and lower edges of the stabilizing members at the location where the stabilizing members attach to the sides of the hull. The lower flange helps to ensure that water is not forced between the sides of the boat and the stabilizing members. The stabilizing members are attached to the sides of the hull without use of holes extending from the exterior to the interior of the hull thereby preventing water from seeping into the hull of the boat.

Although the foregoing patents provide numerous alternatives for ensuring additional flotation for boats as well as some fender means, none of the prior art references teaches a fender means which is inexpensive to manufacture, aesthetically pleasing, and durable. Accordingly, the present invention is directed to overcoming these disadvantages of the prior art fender means.

SUMMARY OF THE INVENTION

The present invention relates, in a first aspect, to a method for the manufacture of a foam collar for use on a boat. The method includes the steps of molding a polymeric foam material by application of heat and pressure to form the foam material into a predetermined shape, removing the foam material from the mold, applying a surface coating to at least a portion of the inner surface of a mold, curing the surface coating in the mold to form a cured surface coating, applying a reinforcement coating in the mold, curing the reinforcement coating to form a cured reinforcement coating, applying adhesives to the cured reinforcement coating, placing the molded foam material into the mold with its outer surface against the adhesive, applying a vacuum over the molded foam material in the mold until the adhesive cures and removing the resultant foam collar from the mold.

In a second aspect, the present invention relates to a foam collar made by the above-described process and which includes a polymeric foam material molded to a predetermined shape, a reinforcement coating on a portion of the outer surface of the polymeric foam material and a surface coating on at least part of the reinforcement coating.

In a third aspect, the present invention relates to a boat comprising a hull having an outer surface and the above-described foam collar attached to the outer surface of the hull of the boat at a point high enough on the hull to ensure that the foam collar is completely above the static waterline of the boat.

The present invention provides a durable, highly attractive foam fender system which can be used on high speed boats with planing hulls. It is considered that this foam collar represents an improvement over prior boats since it does not require inflation, it can be fabricated in an aesthetically pleasing manner, it is-durable and it is inexpensive to make and maintain.

The present invention will be described in greater detail in the detailed description which follows.

DETAILED DESCRIPTION OF THE PREFERRED EMBODIMENTS

Figure 1:
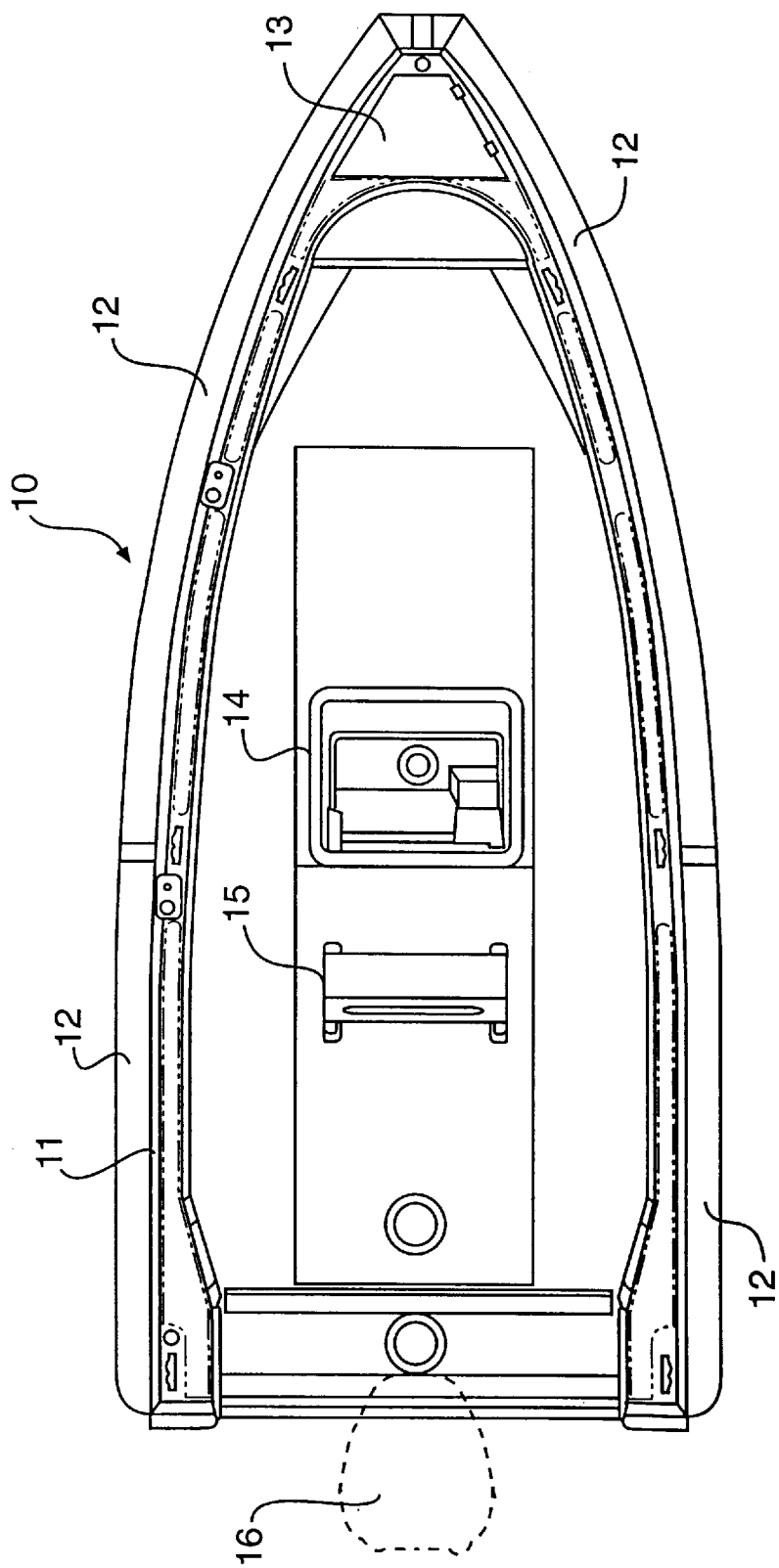
FIG. 1 is a top view of a boat including the foam collar.

Referring to the drawings where like numerals indicate like elements throughout several views, FIG. 1 shows a boat 10 including a hull 11 and a foam collar 12. The boat shown in FIG. 1 also includes a bow box 13, a console 14, a bolster 15 and an engine 16.

From FIG. 1 it can be seen that the preferred embodiment of the boat of the present invention includes four foam collar sections 12 which together form the foam collar of the present invention. The foam collar sections 12 extend around the periphery of the hull 11.

Figure 2:
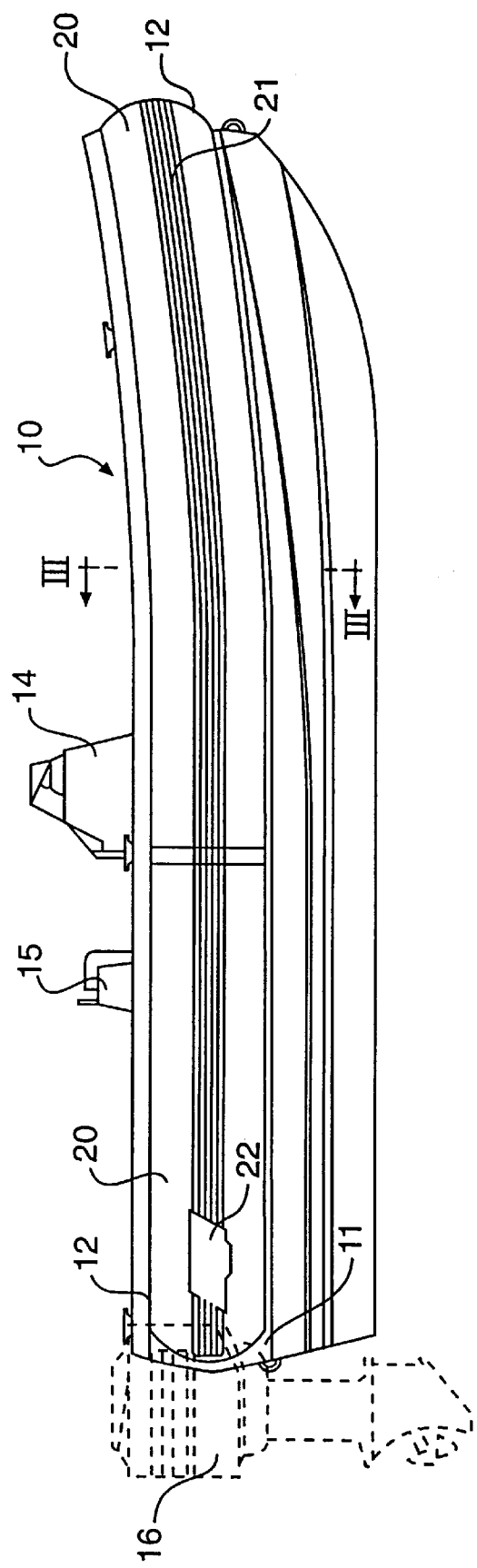
FIG. 2 is a side view of a boat including the foam collar.

Referring to FIG. 2, there is shown a side view of the boat 10 of the present invention. From FIG. 2 it can be seen that the foam collar sections 12 are located on the hull 11 of the boat 10 at a point where the foam collar sections 12 are above the static waterline of the boat. Preferably, the bottom of the foam collar section 12 is 5–50 centimeters above the static waterline so that during normal operation of the boat, the foam collar remains above the surface of the water. Also shown in FIG. 2 is the surface coating 20 of the foam collar sections 12 upon which may be printed, for example, stripes 21, a logo 22 and/or any other design which may be desirable.

Figure 3:
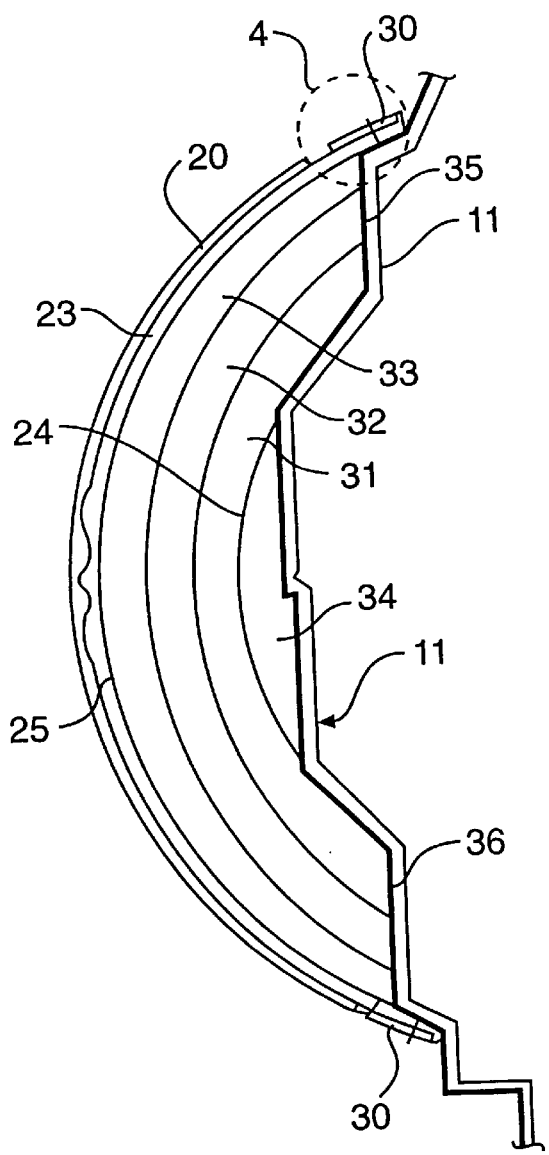
FIG. 3 is a cross-sectional view of the foam collar and the section of the hull of a boat along line III—III of FIG. 2.
Figure 5:
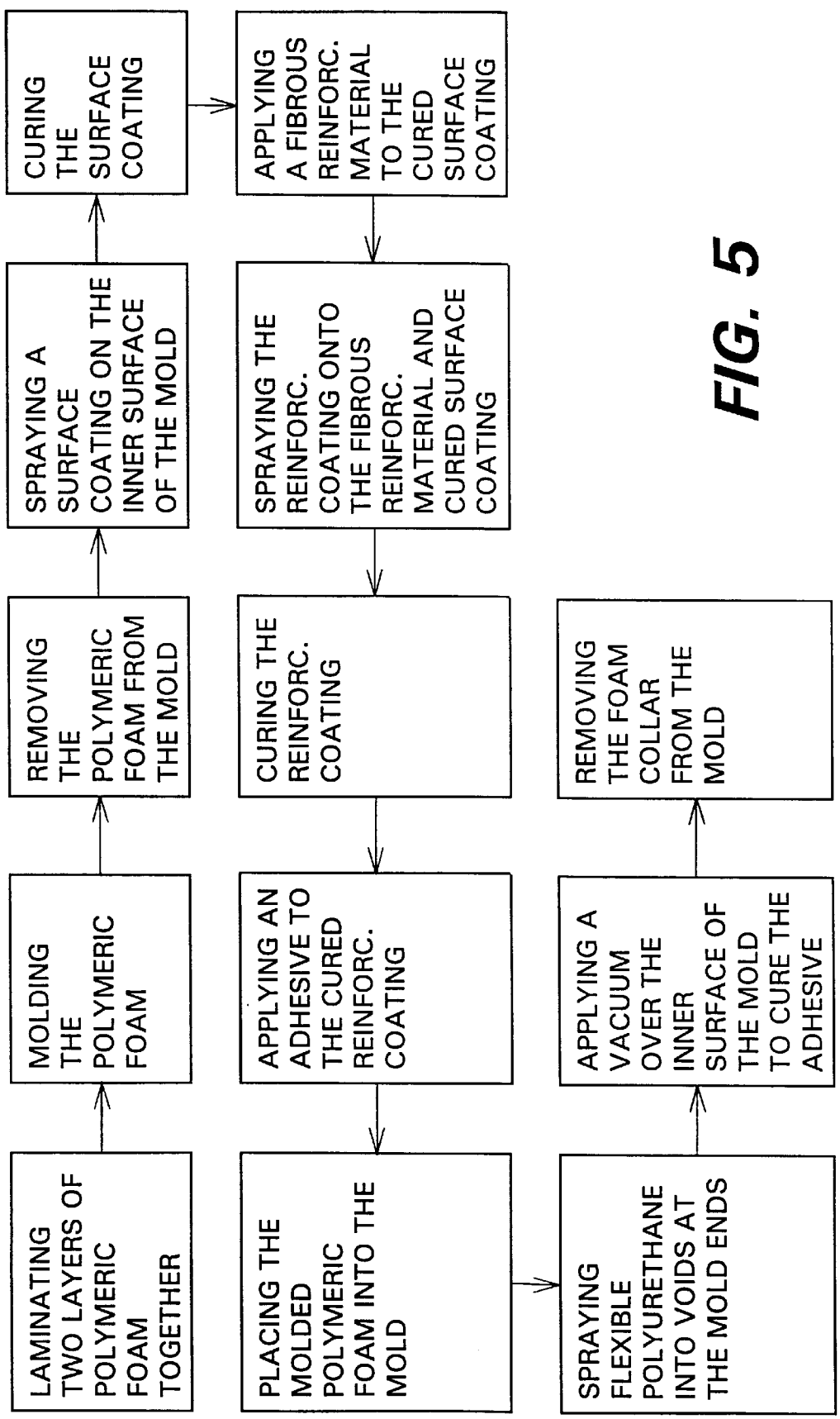
FIG. 5 is a flow chart showing the preferred method of the present invention.

Referring now to FIG. 3, there is shown a cross-sectional view of the foam collar section 12 along the line III—III of FIG. 2. In the preferred embodiment, the foam collar section 12 is made up of a laminate 24 of first, second and third layers 31, 32, 33, respectively, of foam material. The laminate 24 of foam material layers 31–33 is molded preferably to the shape shown in FIG. 3.

On the outer surface of the laminate 24 is a layer of a surface coating 20 and a reinforcement coating 23 which, together are adhered to the laminate 24 by an adhesive layer 25. Laminate 24 is molded so as to have mating surfaces 35, 36 which mate with portions of the hull 11 of boat 10. However, the entire inner surface of the molded laminate 24 need not mate with the hull 11 in the preferred embodiment and thus a gap 34 is formed between the foam collar section 12 and the hull 11 as shown in FIG. 3.

Figure 4:
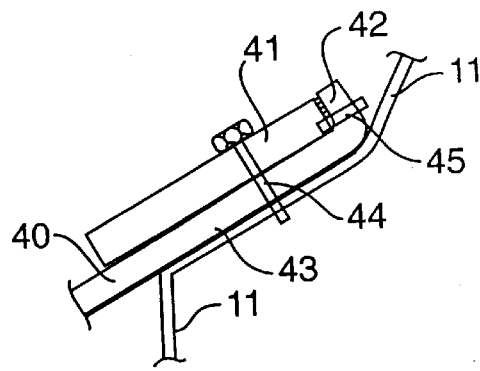
FIG. 4 is a detail of the circled section of FIG. 3.

The foam collar sections 12 are attached to the hull of the boat by one or more attachment means 30, one of which is shown in the detail of FIG. 4. More specifically, the preferred attachment means 30 includes an attachment flange 40 which is formed integrally with and extends from the foam collar section 12. Attachment flange 40 includes a lip 42 at the distal end thereof. A flat bar, 41, preferably made from aluminum, is used to attach attachment flange 40 to hull 11 by virtue of a first fastening means such as a pin 44. The fastening means may be any other suitable conventional fastener such as a screw 45, bolt, nail or bracket. Nylon scrim 43 can be used to reinforce attachment flange 40 to thereby provide additional strength to bear the load of foam collar sections 12.

The molded laminate 24 of the foam collar section 12 of the present invention is preferably made from a copolymer closed cell foam. In particular, three sheets of copolymer are heat fused together to form the foam laminate 24 and the formed foam laminate 24 is molded under heating pressure in a mold to produce the desired shape. A preferred material for the copolymer foam is cross-linked polyethylene-ethylene vinyl-acetate copolymer. However, other conventional closed cell polymeric foams can be employed to fabricate the foam collar sections 12 of the present invention.

The closed-cell polymer foams useful for for making foam collar sections 12 are chosen based on their density, water absorption characteristics and compressive strength. Preferred foams have a density of from about 1.5 lb/ft$^3$ to about 5 lb/ft$^3$ and, more preferably, from about 2 lb/ft$^3$ to about 5 lb/ft$^3$. Water absorption of the foam is preferably less than 0.1 lb/ft$^2$ using ASTM-D3575-84L. Preferred foams have a compressive strength from about 5–9 psi at 25% (ASTM-D3575-91D).

The reinforcement coating 23 of the present invention has for its purpose to impart strength to the foam laminate 24 and the attachment flanges 40. Accordingly, the materials used for the reinforcement coating 23 may be conventional materials known to provide strength. One preferred material for use as the reinforcement coating is polyurethane. The reinforcement coating is applied to a thickness of from about 40 to about 70 mils of dry film thickness. More preferably, the reinforcement coating is 50–60 mils thick in dry film thickness. Nylon scrim 43 may be placed along the attachment flanges 40 and sprayed over with the reinforcement coating 23 as shown in FIGS. 3–4 in order to provide additional strength to attachment flanges 40.

The reinforcement coating 23 is made from materials having good abrasive resistance and elongation. Preferred materials have an abrasive resistance of less than about 1 mg. lost (ASTM (501) and an elongation of at least about 200% (ASTM D412). A preferred material for the reinforcement coating is an abrasive resistant urethane elastomer.

The surface coating 20 is used primarily to provide a pleasing aesthetic feel and appearance for the foam collar sections 12. A preferred material for the surface coating is a two-component polyurethane system which is pigmented to the desired color of the foam collar sections 12. The surface coating 20 is preferably sufficiently thick to cover the entire outer surface of foam collar sections 12 to thereby provide a pleasing aesthetic effect for the foam collar sections 12 when viewed from outside of the boat 10. The surface coating 20, coating thickness and foam density may also be chosen to be smooth and soft to the touch. This is useful for persons getting into and out of the boat who will touch the foam collar sections 12. In addition, the surface coating 20 may be chosen to impart abrasion resistance to the outer surface of the foam collar sections 12 such that when boarding other craft or when docked at a waterfront the foam collar will not be damaged by abrasion.

Optionally, detailing can be provided on the outer surface of the surface coating 20 of the foam collar sections 12. An example of such detailing is shown in FIG. 2 where stripes 21 and a logo 22 are included on the outer surface 20 of the foam collar sections 12. This option provides an additional means of rendering the foam collar sections 12 aesthetically pleasing and can be used to strongly influence the overall aesthetic impact of the boat 10.

Another aspect of the present invention is a method for making the foam collar. In the first step of the method, a polymeric foam material is molded using a mold by application of heat and pressure using conventional molding techniques in order to provide a polymeric foam of a predetermined shape such as the shape shown in FIG. 3 which includes a convex outer surface. The polymeric foam is then removed from the mold and trimmed to remove flash and any other defects and provide a polymeric foam material of the desired shape.

The next step in the process is to provide the surface coating onto the interior of a mold. The surface coating may be sprayed or brushed onto the interior surface of the mold. Once the surface coating is applied to the interior surface of the mold, it is cured to a dry film thickness of from about 3 mils to about 20 mils thick. The thickness of the surface coating 20 is primarily a function of the desired color and/or surface characteristics for the foam collar sections 12.

After curing the surface coating, a reinforcement coating 23 is applied to the mold atop the surface coating 20. The reinforcement coating 23 may also be sprayed, brushed or applied by any conventional means onto the interior surface of the mold atop the surface coating 20. The reinforcement coating 23 is then cured to a dry film thickness of from about 20 to about 70 mils to form a cured reinforcement coating 23. Optionally, reinforcement mesh, which may be nylon scrim 43, is placed along the areas where the attachment flanges 40 will fit in the mold and the strength reinforcement coating 23 is sprayed over the reinforcement mesh 43 so as to include the reinforcement mesh 43 inside of the reinforcement coating 23 and thereby provide additional strength to attachment flange 40.

Once the reinforcement coating 23 has been fully cured to a dry film, an adhesive layer 25 is placed on the cured surface of the reinforcement coating 23 and on the molded surface of the copolymer foam laminate 24. The copolymer foam laminate 24 is then placed in the mold against the adhesion layer 25 and a vacuum is applied over the entire surface of the mold until the adhesive layer 25 cures thereby securing the reinforcement coating 23 directly to the surface of the molded foam laminate 24. Optionally, a flexible polyurethane foam can be applied to fill voids at the mold ends. The application of the flexible polyurethane foam can be by spraying, brushing or any other suitable conventional means. Finally, the completed foam collar section 12 is removed from the mold and trimmed to remove flash or any other defects.

The foam collar sections 12 are preferably designed to key into the molded glass reinforced plastic surface of the hull 11 as shown in FIG. 3. In other words, the mating surfaces 35, 36 are molded to fit closely with the outer surface of the hull 11 as shown in FIG. 3. The foam collar sections could also fit onto an aluminum hull with a similar shape as the glass reinforced plastic hull. The foam collar sections 12 are mechanically attached to the hull 11 by any suitable attachment means. An example of the attachment means are aluminum flat bars 41 which key into a molded lip 42 around the perimeter of the molded surface on the attachment flanges 40. The foam collar sections 12 may then be glued together and the seams between the foam collar sections 12 can be reinforced using a polyvinyl chloride seam tape which is glued into place. In this manner, water can be prevented from entering between the foam collar sections 12. The mating surfaces 35, 36 which key into the hull 11 also help prevent water from coming between foam collar sections 12 and hull 11.

The foam collar of the present invention provides several advantages over prior art constructions which may be used for the same purpose. First, the foam collar of the present invention allows an increase in the inside space of the boat due to the placement of the foam collar on the outside of the hull 11 and above the static waterline of the boat 10. Further, the foam collar of the present invention provides a soft fendering effect which is useful when boarding other boats or mooring the boat since it will prevent damage to the hull of the boat when it comes into contact with other boats or docks.

The foam collar of the present invention may be fabricated to be aesthetically pleasing since it includes a surface coating 20 which can be of a selected color and because the surface coating 20 can be chosen to allow the application of designs and/or logos on the surface coating 20. Further, designs can be molded into the foam collar sections 12 of the present invention in order to provide a three-dimensional textured effect on the outer surface of the foam collar sections 12.

Finally, the foam collar sections 12 of the present invention can be made smooth and soft to the touch, are abrasion resistant and require little or no maintenance since they are not inflatable. Finally, the foam collar of the present invention can be fabricated by the relatively inexpensive molding process described above.

The foregoing description of the invention has been provided for the purposes of illustration and description only. The scope of the invention is to be determined from the claims appended hereto.

What is claimed is:

1. A method for the manufacture of a foam collar for use on a boat, said method comprising the steps of:

molding a polymeric foam material in a mold by application of sufficient heat and pressure in the mold to form the polymeric foam material into a predetermined shape which has an outer surface, removing the molded polymeric foam material from the mold, applying a surface coating onto at least a portion of an inner surface of a mold, curing the surface coating in the mold to form a cured surface coating, applying a reinforcement coating into the mold to at least partially cover the cured surface coating in the mold, curing the reinforcement coating to form a cured reinforcement coating, applying an adhesive to the cured reinforcement coating, any exposed portion of the cured surface coating and to the outer surface of the molded polymeric foam material, placing the molded polymeric foam material into the mold with the outer surface against the cured reinforcement coating and the adhesive, applying a vacuum over the inner surface of the mold until the adhesive cures to thereby form a foam collar, and removing the foam collar from the mold.

2. A method as claimed in claim 1 further comprising the step of laminating at least two sheets of polymeric foam material together to prior to the step of molding the polymeric foam material.

3. A method as claimed in claim 1 wherein the polymeric material is a copolymer of polyethylene and ethylene vinyl acetate.

4. A method as claimed in claim 3 wherein the surface coating and the reinforcement coating each comprise polyurethane.

5. A method as claimed in claim 1 further comprising the step of applying a fibrous reinforcement material to the cured surface coating prior to the step of applying a reinforcement coating to the inner surface of the mold.

6. A method as claimed in claim 1 wherein the surface coating and the reinforcement coating are applied by spraying.

7. A method as claimed in claim 6 further comprising the step of spraying flexible polyurethane foam to fill the voids at the mold ends after the step of placing the molded polyurethane foam material in the mold.

8. A method as claimed in claim 1 wherein the cured surface coating has a film thickness of from about 3 mils to about 20 mils and the cured reinforcement coating has a film thickness of from 40 about mils to about 70 mils.

9. A foam collar which comprises:
   a polymeric foam material molded to a predetermined shape and having an inner surface, at least part of which is adapted to rest against a hull of a boat and an outer surface adapted to face outwardly away from the hull of a boat, said outer surface having a top edge and a bottom edge,
   a reinforcement coating adhesively secured on at least part of the outer surface of the molded polymeric foam material which substantially comprises an abrasion-resistant urethane elastomer, and
   a surface coating adhesively secured on at least part of the reinforcement coating.

10. A foam collar as claimed in claim 9 further comprising at least two attachment flanges each having a proximal end formed integrally with the molded polymeric foam material, and a distal end away from the molded polymeric foam material, said attachment flanges being located at the top and bottom edges of the outer surface.

11. A foam collar as claimed in claim 10 wherein the attachment flanges each have a lip at the distal ends thereof.

12. A foam collar as claimed in claim 11 wherein the polymeric foam material comprises a copolymer of polyethylene and ethylene vinyl acetate.

13. A foam collar as claimed in claim 12 wherein the surface coating comprises polyurethane.

14. A foam collar as claimed in claim 13 wherein the thickness of the reinforcement coating is from about 40 mils to about 70 mils and the thickness of the surface coating is from about 4 mils to about 20 mils.

15. A boat comprising a hull having an outer surface and a foam collar attached to the outer surface of the hull of the boat at a point high enough on the hull to ensure that the foam collar is completely above a static waterline of the boat, said foam collar comprising a polymeric foam material molded to a predetermined shape and having an inner surface, at least part of which is adapted to rest against a hull of a boat and an outer surface adapted to face outwardly away from the hull of a boat, said outer surface having a top edge and a bottom edge, at least two attachment flanges each having a proximal end formed integrally with the molded polymeric foam material, and a distal end away from the molded polymeric foam material, said attachment flanges being located at the top and bottom edges of the outer surface of the polymeric foam material, fastening means for attaching the attachment flanges to the hull of the boat, a reinforcement coating adhesively secured on at least part of the outer surface of the molded polymeric foam material which reinforcement coating substantially comprises an abrasion-resistant urethane elastomer, and a surface coating adhesively secured on at least part of the reinforcement coating.

16. A boat as claimed in claim 15 wherein the attachment flanges each have a lip at the distal ends thereof and wherein the attachment flanges are attached to the hull of the boat by flat bars which are mechanically attached to the hull of the boat by a first fastening means and are mechanically attached to the lip at the distal end of each attachment flange by a second fastening means.

17. A boat as claimed in claim 16 which comprises at least two foam collar sections which are glued together at one end thereof to form said foam collar.

18. A boat as claimed in claim 17 wherein the fastening means comprises a plurality of pins, screws or bolts inserted into a corresponding number of holes in the flat bars and in the attachment flanges, at least some of said pins, screws or bolts also being inserted into holes in the hull of the boat.

19. A boat as claimed in claim 18 wherein the outer surface of the polymeric foam material is convex.

* * * * *